United States Patent
Chang et al.

(10) Patent No.: US 7,120,342 B2
(45) Date of Patent: Oct. 10, 2006

(54) UV-CURABLE AND FOAMABLE RESIN COMPOSITION

(75) Inventors: Se Lee Chang, Ansan-si (KR); Hwa Joong Kim, Seoul (KR); Hae Woog Choi, Bucheon-si (KR); Jung Hyun Oh, Anyang-si (KR); Dae Sung Lee, Kunpo-si (KR)

(73) Assignee: Luvantix Co., Ltd., (KR)

( * ) Notice: Subject to any disclaimer, the term of this patent is extended or adjusted under 35 U.S.C. 154(b) by 137 days.

(21) Appl. No.: 10/516,485

(22) PCT Filed: Mar. 21, 2003

(86) PCT No.: PCT/KR03/00550

§ 371 (c)(1),
(2), (4) Date: Nov. 30, 2004

(87) PCT Pub. No.: WO03/102035

PCT Pub. Date: Dec. 11, 2003

(65) Prior Publication Data

US 2005/0213910 A1     Sep. 29, 2005

(30) Foreign Application Priority Data

May 31, 2002   (KR)   ...................... 10-2002-0030561

(51) Int. Cl.
G02B 6/22   (2006.01)

(52) U.S. Cl. .................. 385/128; 385/115; 385/126; 385/145

(58) Field of Classification Search ................ 385/115, 385/123–128, 141–145; 522/1, 2, 6, 109
See application file for complete search history.

(56) References Cited

U.S. PATENT DOCUMENTS

| 5,182,786 A | * | 1/1993 | Kinaga et al. ............... 385/128 |
| 6,486,225 B1 | * | 11/2002 | Kamata et al. ................ 522/14 |
| 7,044,475 B1 | * | 5/2006 | Imai et al. .................... 277/650 |
| 7,046,904 B1 | * | 5/2006 | Chang et al. ............... 385/145 |

FOREIGN PATENT DOCUMENTS

JP      09-324136      * 12/1997

* cited by examiner

*Primary Examiner*—Kevin S. Wood
(74) *Attorney, Agent, or Firm*—Anderson Kill & Olick, P.C.

(57) ABSTRACT

A UV-curable and foamable resin composition comprising a photopolymerizable urethane acrylate oligomer, a photopolymerable monomer, a photo polymerization initiator, a photolytic foaming agent selected from an azo compound, a combination of sulonium salt and an inorganic carbonate, and a mixture thereof, and a photolysis catalyst is useful for coating a fiber or ribbon bundle to be applied to an air blown fiber system.

7 Claims, No Drawings

UV-CURABLE AND FOAMABLE RESIN COMPOSITION

FIELD OF THE INVENTION

The present invention is directed to a UV-curable and foamable resin composition which is useful for coating a fiber or ribbon bundle employed in an air blown fiber system.

BACKGROUND OF THE INVENTION

The so-called air blown fiber system (ABF) is characterized by a fiber laying process that comprises blowing a fiber bundle through a tube cable using compressed air or dry nitrogen. Lightweight and flexibility are required of such fiber bundle used in an ABF system. The main advantage of the air blown fiber system is that a long fiber bundle can be blown through a tube cable laid in a given network and, if necessary, the fiber bundle can be discharged from the tube cable and reused. Due to such advantage, the ABF system has been applied to optical fiber wiring for indoors, in particular, network systems in high-rise buildings.

A fiber unit used in the ABF system comprises a fiber or ribbon bundle, and a sheath layer coated thereon, the sheath layer being composed of two layers, i.e., an inner tight bundle coating layer which tightly wraps the fiber or ribbon bundle and a lightweight outer layer which imparts high strength and good flexibility to the fiber bundle. In the past, the two layers of the fiber unit have been formed by injection molding or by a combination of a UV-curing process for the inner layer and an injection/foaming process for the outer layer. Since, the productivity of the injection method is lower than that of the UV-curing process, there has recently been suggested a method of applying the UV curing process to the outer coating layer. For example, U.S. Pat. Nos. 5,557,703, 5,563,985, 5,903,693, 5,970,195, 6,101,304 and 6,249,629 disclose a method of forming a low-density outer layer by admixing a lightweight microsphere composition with a UV-curable resin. However, this method has disadvantages in that such a microsphere composition has to be mixed right before curing and the resulting resin coating is not uniform.

Thus, there has been a need to develop a UV-curable resin composition which can be used to form a light-weight, homogeneously foamed secured layer.

SUMMARY OF THE INVENTION

It is, therefore, an object of the present invention to provide a UV-curable and foamable resin composition suitable for optical article application.

In accordance with one aspect of the present invention, there is provided a UV-curable and foamable resin composition comprising: (A) a photopolymerizable urethane acrylate oligomer, (B) a photopolymerizable monomer, (C) a photopolymerization initiator, (D) a photolytic foaming agent selected from an azo compound, a combination of a sulfonium salt and an inorganic carbonate, and a mixture thereof, and (E) a photolysis catalyst.

DETAILED DESCRIPTION OF THE INVENTION

The inventive UV-curable and foamable resin composition is characterized by employing a photolytic foaming agent such as a sulfonium salt and an azo compound with a photopolymerizable urethane acrylate oligomer.

Photolytic Foaming Agent

The photolytic foaming agent(D) used in the composition of the present invention generates a gas when irradiated with light, leading to foaming of composition.

A sulfonium salt produces a large amount of acid under light, and, therefore, a sulfonium salt may be used in combination with an inorganic carbonate, e.g., calcium carbonate, sodium bicarbonate and potassium carbonate, to generate carbon dioxide.

Representative examples of the sulfonium salt include the following compounds:

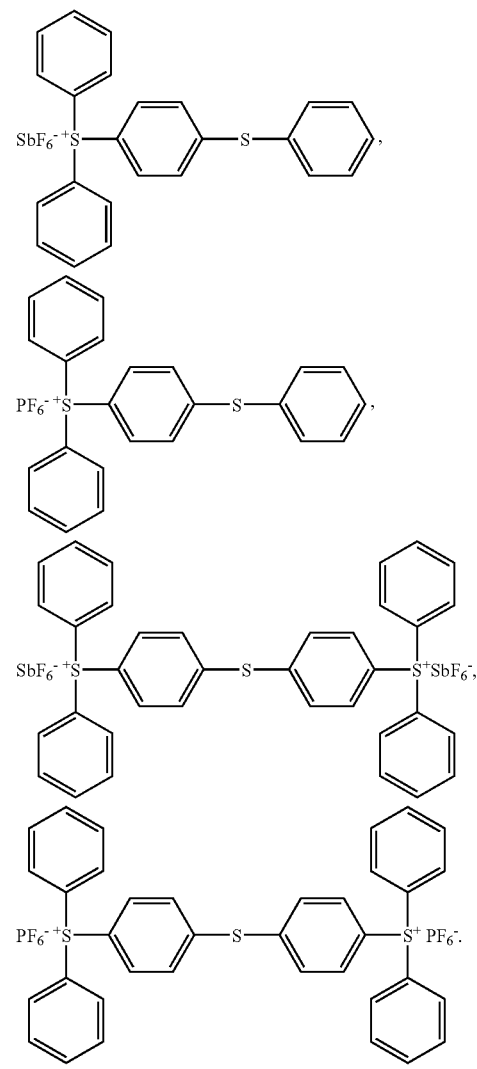

An azo compound which may be used in the present invention decomposes by the action of 200~300 nm UV to generate nitrogen, as shown in Scheme B:

Reaction Scheme B

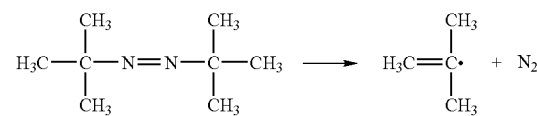

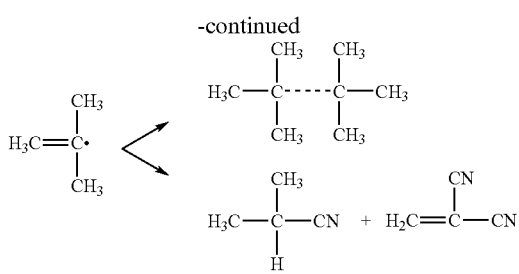

Representative examples of the azo compound employable in the present invention are 2,2-azobis(4-methoxy-2,4-dimethylvaleronitrile), 2,2,-azobis(2,4-dimethylvaleronitrile), 2,2-azobisisobutyronitrile, dimethyl 2,2-azobisisobutyrate, 2,2-azobis(2-methylbutyronitrile), 1,1-azobis(1-cyclohexanecarbonitrile), 2-(carbamoylazo)-isobutyronitrile, 2,2-azobis(2,4,4-trimethylpentane), 2,2-azobis(N,N-dimethyleneisobutylamidine)dihydrochloride, 2,2-azobis(2-aminopropane)dihydrochloride, 2,2-azobis (NN-dimethyleneisobutylamide), 4,4-azobis[2-methyl-N-(2-hydroxyl)propionamide], azobenzene, azobis-tert-butane, azodicarbonamide.

In a preferred embodiment, the photolytic foaming agent may be employed in an amount ranging from 0.1 to 20 wt %, more preferably 1 to 10 wt %, most preferably 2 to 3 wt % based on the total weight of the composition. If the content of the photolytic foaming agent is less than 0.1 wt %, desired foaming effect cannot be acquired, and if it is more than 20 wt %, it does not completely dissolve in the resin composition.

Photolysis Catalyst

It is preferable that the photolytic foaming agent(D) is used together with a photolysis catalyst(E) such as cobalt(II) acetate and copper(II) acetate. In a preferred embodiment, the photolysis catalyst(E) may be employed in an amount ranging from 0.01 to 5 wt %, more preferably 2 to 3 wt % based on the total weight of the composition. When the content of the catalyst is more than 5 wt %, the storage stability of the resin composition becomes poor due to the gelation of the composition.

Photopolymerizable Urethane Acrylate Olijomer

The photopolymerizable urethane acrylate oligomer(A) used in the composition according to the invention may be synthesized using (i) a polyol copolymer, (ii) a polyisocyanate, (iii) a hydroxy(meth)acrylate, (iv) an urethane reaction catalyst, (v) a polymerization initiator and (vi) other ingredients, and it is preferably employed in the range of 45 to 80 wt % based on the total weight of the composition. If the amount of the photopolymerizable urethane acrylate oligomer is less than 45 wt %, curing shrinkage and poor optical property result, and if it is more than 80% by weight, the viscosity becomes undesirably high.

(i) Polyol Copolymer

A preferable polyol copolymer is a compound having molecular weight ranging from 100 to 10,000 and a repeating unit of —$CH_2CH_2O$— or —$CH_2CH(CH_2CH_3)O$—.

Representative examples of the polyol copolymer used in the preparation of a photopolymerizable urethane acrylate oligomer include polyester polyol, polyether polyol, polycarbonate polyol, polycaprolactone polyol, ring-opened tetrahydrofurane, propylene oxide copolymer and a mixture thereof, preferably, polyester polyol and ring-opened tetrahydrofurane.

The polyol copolymer may be optionally mixed with a diol compound, the preferable amount of the diol being about 0.1 to 5 wt % based on the total weight of the polyol copolymer. Representative examples of the diol compound include ethylene glycol, propylene glycol, 1,4-butanediol, 1,5-pentanediol, 1,6-hexanediol, neopenthyl glycol, 1,4-cyclohexanedimethanol, bisphenol-A, bisphenol-F and a mixture thereof In a preferred embodiment, the polyol copolymer may be employed in an amount ranging from 5 to 30 wt %, more preferably 10 to 15 wt % based on the amount of the photopolymerizable urethane acrylate oligomer composition.

(ii) Polyisocyanate

A polyisocyanate is preferably selected from the group of consisting of 2,4-tolylenediisocyanate, 2,6-tolylenediisocyanate, 1,3-xylenediisocyanate, 1,4-xylenediisocyanate, 1,5-naphthalenediisocyanate, 1,6-hexanediisocyanate, isophorondiisocyanate and a mixture thereof. In a preferred embodiment, the polyisocyanate is used in an amount ranging from 20 to 40 wt % based on the amount of the photopolymerizable urethane acrylate oligomer.

(iii) Hydroxy(meth)acrylate

A hydroxy(meth)acrylate is a compound comprising at least one (meth)acrylate and one hydroxy group and preferably selected from the group consisting of 2-hydroxyethyl (meth)acrylate, 2-hydroxypropyl(meth)acrylate, 2-hydroxybutyl(meth)acrylate, 2-hydroxyethyl acrylate, 2-hydroxypropyl acrylate, 2-hydroxy-3-phenyloxypropyl (meth)acrylate, 4-hycroxybutyl acrylate, neopentyl glycomono(meth)acrylate, 4-hydroxycyclohexyl(meth)acrylate, 1,6-hexanediol mono(meth)acrylate, pentaerytliritol penta(meth)acrylate, dipentaerytlritol penta(meth)acrylate and a mixture thereof. In a preferred embodiment, the hydroxy(meth)acrylate is used in an amount ranging from 20 to 35 wt % based on the amount of the photopolymerizable urethane acrylate oligomer composition.

(iv) Urethane Reaction Catalyst

An urethane reaction catalyst that catalyze the urethane reaction is preferably selected from the group consisting of copper naphthenate, cobalt naphthenate, zinc naphthenate, n-butyltin laurate, tristylamine, 2-methyltriethylenediamide and a mixture thereof. In a preferred embodiment, the urethane reaction catalyst is employed in an amount ranging from 0.01 to 1 wt % based on the amount of the photopolymerizable urethane acrylate oligomer composition.

(v) Polymerization Initiator

A polymerization initiator is preferably selected from the group consisting of hydroquinone, hydroquinonemonomethyl ether, para-benzoquinone, phenothiazin and a mixture thereof. In a preferred embodiment, the polymerization initiator is used in an amount ranging from 0.01 to 1 wt % based on the amount of the photopolymerizable urethane acrylate oligomer composition.

(vi) Other Ingredients

Other ingredients which may be added to the photopolymerizable urethane acrylate oligomer composition, e.g., a labeling agent, a dispersion agent and an antifoaming agent are preferably selected from the group consisting of PP1362D, CP1481SF, CP1481F, PE1500F, PEW1555, PE1544F, TF1778, TF1780, TF1830, TFW1765, D2S, E2S, A1601, and HM 1666 (Manufactured by Langer&Co. Ltd.); SYLOID63, SYLOID65, SYLOID66, SYLOID72, SYLOID74, SYLOID79, SYLOID404, SYLOID620, SYLOID308, SYLOID978, SYLOID160, SYLOID161, SYLOID162, SYLOID800, SYLOID810, SYLOID150, SYLOID244, SYLOID266, and SYLOID255 (Manufactured by Grace Co. Ltd.); Irganox 1010, Irganox 1035, and Irganox 1076 (Maunfactured by Cibageigy Co. Ltd.); HK125, HK400, OK412, OK412LC, OK520, OK607, TS100, and TT600 (Manufactured by Degussa Co. Ltd.); Anti-Terra-203, Anti-Terra-204, Anti-Terra-205, Anti-Terra-206, Anti-Terra-U, Anti-Terra-U80, BYK-151, BYK-154, BYK-220S, BYK-P104, BYK-P104S, BYK-P105, Bykumen, Disperbyk, Disperbyk-101, Disperbyk-103, Disperbyk-107, Disperbyk-108, Disperbyk-110, Disperbyk-111, Disperbyk-115, Disperbyk-116, Disperbyk-130, Disperbyk-140, Disperbyk-160, Disperbyk-161, Disperbyk-162, Disperbyk-163, Disperbyk-164, Disperbyk-166, Disperbyk-167, Disperbyk-169, Disperbyk-170, Disperbyk-171, Disperbyk-174, Disperbyk-180, Disperbyk-181, Disperbyk-182, Disperbyk-183, Disperbyk-184, Disperbyk-185, Disperbyk-190, Lactimon, and Lactiomon-WS (Manufactured by BYK-Chemie. Co. Ltd.). The ingredients are added preferably in an amount of from 0.1 to 5 wt %, more preferably 0.5 to 1 wt % based on the amount of the photopolymerizable urethane acrylate oligomer.

The photopolymerizable urethane acrylate oligomer(A) may be prepared by a conventional method, and a preferred embodiment is as follows: A polyol copolymer, a polyol compound and a polymerization initiator are placed into a polymerization reactor, and water is removed under a reduced pressure. The mixture is heated to 40 to 65° C., and a polyisocyanate is added to the resulting mixture with stirring at 200 to 300 rpm, followed by adding one third amount of the catalyst to the mixture. After the ensuing exotherm subsides, the reaction is carried out at a temperature ranging from 50 to 75° C. for about 2 to 3 hours until no —OH peak is observable by IR. Then, an acrylate alcohol is added to the mixture. After the ensuing exotherm, the mixture is heated to a temperature in the range of from 60 to 80° C., and, then, the remaining catalyst is added thereto. The reaction is carried out until no —NCO peak is detectable by IR, to obtain a photopolymerizable urethane acrylate oligomer of the present invention.

Photopolymerzable Monomer

A photopolymerizable monomer(B) which may be used in the composition of the present invention has at least one (meth)acrylate or vinyl group, and is used for lowering the viscosity of the macromolecule oligomer. The photopolymerizable monomer suitable for practicing the invention is a compound that gives a polymer of high tensile strength and low curing shrinkage, and is preferably selected from the group consisting of phenoxyethyl acrylate, phenoxy diethyleneglycol acrylate, phenoxy tetraethyleneglycol acrylate, phenoxy hexaethyleneglycol acrylate, isobornyl acrylate(I-BOA), isobornyl methacrylate, N-vinylpyrrolidone(N-VP), bisphenol ethoxylate diacrylate, ethoxylate phenol monoacrylate, polyethylene glycol 200 diacrylate, tripropylene glycol diacrylate, triethylpropane triacrylate(TMPTA), polyethyleneglycol diacrylate, ethyleneoxide added triethylpropanetriacrylate, ethoxy added triethylolpropane triacrylate, pentaerythritol tetraacrylate(PETA), 1,4-butanediol diacrylate, 1,6-hexanediol diacrylate, ethoxylated pentaerytliritol tetraacrylate, 2-phenoxyethyl acrylate, ethoxylated bisphenol A diacrylate and a mixture thereof. In a preferred embodiment, the photopolymerizable monomer may be used in an amount ranging 15 to 50 wt % based on the total weight of the resin composition. If the monomer content is less than 15 wt %, it is difficult to adjust the viscosity down to a workable level in the range of 5000 to 8000 cps (at 25° C.), and if it is more than 50 wt %, unacceptable curing shrinkage of the film results.

Photopolymerization Initiator

A photopolymerization initiator(C) used in the composition of the present invention is added in order to maintain rapid curing of the resin since the coating of an optical fiber is performed under a rapid line velocity of at least 300 m/min.

Representative examples of the photopolymerization initiator employed in the present invention are Irgacure#184 (hydroxycyclohexyl phenyl ketone), Irgacure#907(2-methyl-1-[4-(methylthio)phenyl]-2-morpholino-propan-1-one), Irgacure#500, Irgacure#651, Darocure#1173 (2-hydroxy-2-methyl-1-phenyl-propan-1-one), Darocure#116, CGI#1800, CGI#1700 and a mixture thereof. In a preferred embodiment, the initiator may be used in an amount ranging from 0.5 to 10 wt % based on the total weight of the composition. If the content of the initiator is less than 0.5 wt %, hardness and chemical resistance of the composition decrease due to delaying in curing, and if it is more than 10 wt %, the storage stability deteriorates.

Other Additives

The composition of the present invention may comprise other additives such as a labeling agent, a dispersion agent, an antifoaming agent, and an antioxidant.

The labeling agent, the dispersion agent and the antifoaming agent are those conventionally used in the preparation of the photopolymerizable urethane acrylate oligomer. In a preferred embodiment, they are used in an amount ranging from 0.1 to 5% based on the total weight of the composition. In addition, representative examples of the antioxidant are Irganox 1010, Irganox 1035, Irganox 1076 (Manufactured by Ciba Geigy Co. Ltd.) and a mixture thereof. In a preferred embodiment, the antioxidant may be employed in an amount ranging from 0.1 to 5 wt % based on the total weight of the composition.

Compounding of the Components

The inventive UV-curable and foamable resin composition may be produced by mixing a photopolymerizable urethane acrylate oligomer, a photopolymerizable monomer, a photolytic foaming agent, a photolytic catalyst, a photopolymerization initiator and other ingredients homogeneously by a conventional method. In a preferred embodiment, the mixture is stirred at a rate of at least 1000 rpm, at a temperature ranging from 15 to 50° C. and a relative humidity not more than 60%.

If the photolytic foaming agent does not readily dissolve in a conventional acrylate monomer, it may be hast diluted with a (meth)acrylate monomer having a molecular weight of less than 150, before adding to the composition. As the foaming agent decomposes easily by heat produced during stirrings, the resulting mixture is preferably stirred at a rate below 500 rpm.

Modulus spectra of an inner and an outer coating layers of an air blown fiber unit are approximately $1 \times 10^9$ N/m$^2$ and $4 \times 10^7$ N/m$^2$, respectively, and the thicknesses of the two coating layers are 0.1 to 0.2 mm and about 2 mm, respectively. The layers formed using the composition according to the present invention satisfy the above requirements.

The present invention is further described and illustrated in Examples provided below, which are, however, not intended to limit the scope of the present invention.

Preparation of Photopolymerizable Urethane Acrylate Oligomers

EXAMPLE 1

885.5 g of polytetramethylene glycol (diol type, M.W.; 1000), 48.8 g of methylpropanediol (M.W.; 90) and 634.5 g of isophorone diisocyanate (IPDI) were placed in a 2 L flask. The resulting mixture was heated to 40° C. to 50° C. and, then, 1 g of n-butyltin laurate (DBTL) was added thereto. After the initial exothermic stage, the mixture was kept at a temperature of 50° C. to 70° C. until no —OH peak was observable by IR. Then, 2.25 g of hydroquinone monomethyl ether (HQMMA) and 427 g of 2-hydroxypropyl acrylate (2-BPA) were added to the mixture. After the ensuing exotherm subsided, the mixture was kept at 60° C. to 75° C. until no —NCO peak was detectable by IR, and 2 g of n-butyltin laurate was added to the resulting mixture, to obtain a photopolymerizable urethane acrylate oligomer.

EXAMPLE 2

1278.02 g of polytetramethylene glycol (diol type, M.W.; 3000) of diol type and 189.4 g of isophorone diisocyanate were placed in a 2 L flask. The resulting mixture was heated to 40° C. to 50° C. and, then, 0.8 g of n-butyltin laurate was added thereto. After the initial exotherm subsided, the mixture was maintained at a temperature of 50° C. to 70° C. until no —OH peak was observable by IR. Then, 2.20 g of hydroquinone monomethyl ether and 127.38 g of 2-hydroxypropyl acrylate were added thereto. After the ensuing exotherm subsided, the mixture was kept at 60° C. to 75° C. until no —NCO peak was detectable by IR, and 1.5 g of n-butyltin laurate was added to the resulting mixture, to obtain a photopolymerizable urethane acrylate oligomer.

EXAMPLE 3

352.32 g of polytetramethylene glycol (diol type, M.W.; 1000), 285.38 g of polycaprolactone polyol (TONE-0305; M.W.; 540) and 636.34 g of isophorone diisocyanate were placed in a 2 L flask. The resulting mixture was heated to 40° C. to 50° C. and, then, 0.8 g of n-butyltin laurate was added thereto. After the initial exotherm subsided, the mixture was kept at a temperature of 50° C. to 70° C. until no —OH peak was observable by IR. Then, 2.25 g of hydroquinone monomethyl ether and 520.98 g of 2-hydroxypropyl acrylate were added thereto. After the ensuing exotherm subsided, the mixture was kept at 60° C. to 75° C. until no —NCO peak was detectable by IR, and 1.7 g of n-butyltin laurate was added to the resulting mixture, to obtain a photopolymerizable urethane acrylate oligomer.

EXAMPLE 4

860.5 g of polytetramethylene glycol (diol type, M.W.; 1000), 57.2 g of methylpropanediol (M.W.; 90) and 674.5 g of 2,4-toylene diisocyanate were placed in a 2 L flask. The resulting mixture was heated to 40° C. to 50° C. and, then, 1 g of n-butyltin laurate was added thereto. After the initial exotherm, the mixture was kept at 50° C. to 70° C. until no —OH peak was observable by IR. Then, 2.15 g of hydroquinone monomethyl ether and 450 g of 2-hydroxypropylacrylate were added thereto. After the ensuing exotherm, the mixture was maintained at 60° C. to 75° C. until no —NCO peak was detectable by IR, and 2 g of n-butyltin laurate was added to the resulting mixture, to obtain a photopolymerizable urethane acrylate oligomer.

EXAMPLE 5

855.5 g of polytetramethylene glycol (diol type, M.W.; 1000), 48.8 g of methylpropanediol (M.W.; 90) and 630.5 g of 1.5-naphthalene diisocyanate were placed in a 2 L flask. The resulting mixture was heated to 40° C. to 50° C. and, then, 1 g of n-butyltin laurate was added thereto. After the initial exotherm subsided, the mixture was kept at 50° C. to 70° C. until no —OH peak was observable by IR spectrum. Then, 2.25 g of hydroquinone monomethylether and 427 g of 2-hydroxypropyl acrylate were added thereto. After the ensuing exotherm subsided, the mixture was kept at 60° C. to 75° C. until no —NCO peak was detectable by IR, and 2 g of n-butyltin laurate was added to the resulting mixture, to obtain a photopolymerizable urethane acrylate oligomer.

EXAMPLE 6

885.5 g of polytetramethylene glycol (diol type, M.W.; 1000), 48.8 g of methylpropanediol (M.W.; 90) and 634.5 g of isophorone diisocyanate were placed in a 2 L flask. The resulting mixture was heated to 40° C. to 50° C. and, then, 1 g of n-butyltin laurate was added thereto. After the initial exotherm, the mixture was kept at 50° C. to 70° C. until no —OH peak was observable by IR. Then, 2.25 g of hydroquinone monomethyl ether and 447.6 g of 2-hydroxybutyl methacrylate were added thereto. After the ensuing exothermic subsided, the mixture was kept at 60° C. to 75° C. until no —NCO peak was detectable by IR, and 2 g of n-butyltin laurate was added to the resulting mixture, to obtain a photopolymerizable urethane acrylate oligomer.

EXAMPLE 7

885.5 g of polytetramethylene glycol (diol type, M.W.; 1000), 48.8 g of methylpropanediol (M.W.; 90) and 634.5 g of isophorone diisocyanate were placed in a 2 L flask. The resulting mixture was heated to 40° C. to 50° C. and, then, 0.5 g of 2-methyltriethylenediamide was added thereto. After the initial exotherm subsided, the mixture was kept at 50° C. to 70° C. until no —OH peak was observable by IR. Then, 2.25 g of hydroquinone monomethyl ether and 427 g of 2-hydroxypropyl acrylate were added thereto. After the ensuing exotherm subsided, the mixture was reacted at 60° C. to 75° C. until no —NCO peak was detectable by IR, and 1.5 g of 2-methyltriethylene diamide was added to the resulting mixture, to prepare a photopolymerizable urethane acrylate oligomer.

Preparation of UV-Curable and Foamable Resin Compositions According to The Present Invention

EXAMPLE 8

A UV-curable and foamable resin composition was prepared by mixing 70 g of the oligomer prepared in Example 1, 23 g of isobornylacrylate, 3.8 g of Irgacure #184, 0.5 g of PE1500F, 0.5 g of Anti-Terra-206 and 1 g of Irganox 1010, and, then, adding thereto 1 g of 1,1-azobis(cyclohexane-1-carbonitrile) as a photolytic foaming agent, and 0.2 g of cobalt acetate as a photolysis catalyst.

EXAMPLES 9 to 11

The procedure of Example 8 was repeated except that each oligomer prepared in Examples 2 to 4 was used in place of the oligomer prepared in Example 1.

EXAMPLES 12 to 14

The procedure of Example 8 was repeated except that each of the oligomers prepared in Examples 5 to 7 was used in place of the oligomer prepared in Example 1, in an amount corresponding to 50 g of the total composition.

EXAMPLES 15 to 18

The procedure of Example 8 was repeated four times using, instead of 1,1-azobis(cyclohexane-1-carbonitrile), 2,2-azobis(4-methoxy-2,4-dimethylvaleronitrile), 2,2-azobis(methylbutyronitrile), 2,2-azobisisobutyronitrile and 1,1-azobis(cyclohexane-1-carbonitrile), respectively.

Preparation of Non-Foamable Resin Composition

COMPARATIVE EXAMPLE 1

The procedure of Example 8 was repeated without the photolytic foaming agent and the photolysis catalyst.

COMPARATIVE EXAMPLES 2 to 7

The procedure of Comparative Example 1 was repeated except that each of the oligomers prepared in Examples 2 to 7 was used in place of the oligomer prepared in Example 1.

Physical Characteristics (1) Specific Gravity

Cured films were obtained from the compositions according to the Examples by photocuring and foaming with a 600 Watt UV D bulb (a fusion lamp of no-electrode type), at a passing speed of 5 to 200 m/min and from the compositions according to the Comparative Examples by curing at a passing speed of 40 m/min. The specific gravities of the films were measured and the results are shown in Table 1.

TABLE 1

| | Specific gravity (g/cm$^3$) | | Specific gravity (g/cm$^3$) |
|---|---|---|---|
| Comparative Example 1 | 1.23 | Example 8 | 0.7 |
| Comparative Example 2 | 1.15 | Example 9 | 0.6 |
| Comparative Example 3 | 1.24 | Example 10 | 0.7 |
| Comparative Example 4 | 1.27 | Example 11 | 0.75 |
| Comparative Example 5 | 1.25 | Example 12 | 0.75 |
| Comparative Example 6 | 1.27 | Example 13 | 0.75 |
| Comparative Example 7 | 1.27 | Example 14 | 0.75 |
| | | Example 15 | 0.75 |
| | | Example 16 | 0.80 |
| | | Example 17 | 0.75 |

As can be seen from Table 1, specific gravities of the films manufactured from the resin compositions according to the present invention are low in the range of 0.5 to 0.8 g/cm$^2$, and, therefore, suitable for use as an optical fiber coating.

(2) Viscosity

Viscosities of the compositions prepared in Examples 8 to 14 were measured in accordance with the method of ASTM D-2196 (Brookfield DV-II+, Spindle No. 41, 3 rpm) at 25° C., and the results shown in Table 2 are well within the viscosity range suitable for optical fiber coating; 1000 to 5000 cps. If the viscosity is less than 1000 cps, it is difficult to maintain a uniform coating thickness, and if it is more than 5000 cps, gelation may occur.

TABLE 2

| | Viscosity (cPs) |
|---|---|
| Example 8 | 1400 |
| Example 9 | 2500 |
| Example 10 | 1700 |
| Example 11 | 1250 |
| Example 12 | 1150 |
| Example 13 | 1140 |
| Example 14 | 1130 |
| Example 15 | 1400 |
| Example 16 | 1400 |
| Example 17 | 1400 |

(3) Tensile Strength

Tensile strengths of cured sample of the compositions prepared in Examples 8 to 14 were measured (Instron 4443) in accordance with the method of ASTM D-638 at room temperature, and the results show satisfactory strength for optical fiber application, as shown in Table 3.

TABLE 3

| | Tensile strength (kg/mm$^2$) |
|---|---|
| Example 8 | 5.0 |
| Example 9 | 0.5 |
| Example 10 | 7.5 |
| Example 11 | 6.5 |
| Example 12 | 5.5 |
| Example 13 | 6.0 |
| Example 14 | 6.0 |
| Example 15 | 6.5 |
| Example 16 | 6.5 |
| Example 17 | 6.5 |

What is claimed is:

1. A process for preparing a UV-cured foam by irradiating UV light to a composition comprising: (A) a photolytic foaming agent selected from an azo compound, a combination of a sulfonium salt and an inorganic carbonate, and a mixture thereof, (B) a photopolymerizable urethane acrylate oligomer, (C) a photopolymerizable monomer, (D) a photopolymerization initiator, and (E) a photolysis catalyst.

2. The process of claim 1, wherein the composition comprises (A) 0.1 to 20 wt % of a photolytic foaming agent, (B) 45 to 80 wt % of a photopolymerizable urethane acrylate oligomer, (C) 15 to 50 wt % of a photopolymerizable monomer, (D) 0.01 to 5 wt % of a photopolymerization initiator, and (E) 0.01 to 5 wt % of a photolysis catalyst, the weight percent being based on the total amount of the composition.

3. The process of claim 1, wherein the azo compound is selected from the group consisting of 2,2-azobis(4-methoxy-2,4-dimethylvaleronitrile), 2,2-azobis(2,4-dimethylvaleronitrile), 2,2-azobisisobutyronitrile, dimethyl 2,2-azobisisobutyrate, 2,2-azobis(2-methylbutyronitrile), 1,1-azobis(1-cyclohexanecarbonitrile), 2-(carbamoylazo)-isobutyronitrile, 2,2-azobis(2,4,4-trimethylpentane), 2,2-azobis(N,N-dimethyleneisobutylamidine)dihydrochloride, 2,2-azobis(2-aminopropane)dihydrochloride, 2,2-azobis(N,N-dimethyleneisobutylamide), 4,4-azobis[2-methyl-N-(2-hydroxyl)propionamide], azobenzene, azobis-tert-butane, and a mixture thereof.

4. The process of claim 1, wherein the sulfonium salt is selected from the group consisting of compounds of formulas, and the inorganic carbonate is selected from the group consisting of calcium carbonate, sodium bicarbonate and potassium carbonate:

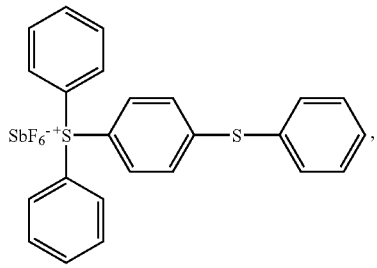

,

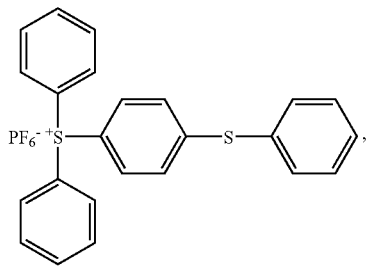

,

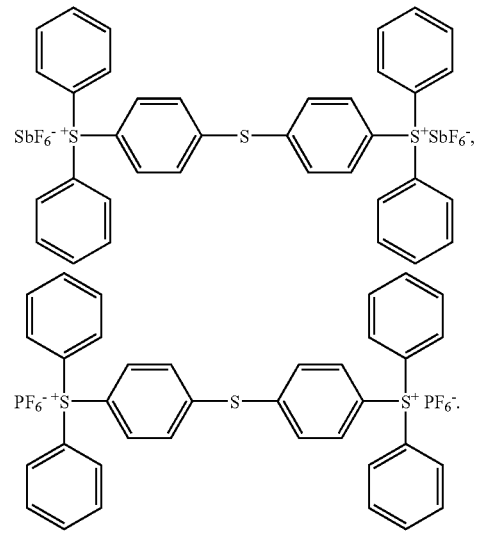

.

5. The process of claim 1, wherein the photolysis catalyst is cobalt(II) acetate or copper(II) acetate.

6. The process of claim 1, wherein the composition is coated on an optical article.

7. The process of claim 6, wherein the optical article is a fiber bundle applied to an air blown fiber system.

* * * * *